(12) United States Patent
Takahashi

(10) Patent No.: US 10,488,113 B2
(45) Date of Patent: Nov. 26, 2019

(54) METHOD AND DEVICE FOR DRIVING CONDUCTIVE METAL

(71) Applicant: Kenzo Takahashi, Matsudo (JP)

(72) Inventor: Kenzo Takahashi, Matsudo (JP)

( * ) Notice: Subject to any disclaimer, the term of this patent is extended or adjusted under 35 U.S.C. 154(b) by 242 days.

(21) Appl. No.: 15/539,759

(22) PCT Filed: Dec. 14, 2015

(86) PCT No.: PCT/JP2015/084981
§ 371 (c)(1),
(2) Date: Jun. 26, 2017

(87) PCT Pub. No.: WO2016/104228
PCT Pub. Date: Jun. 30, 2016

(65) Prior Publication Data
US 2018/0087840 A1 Mar. 29, 2018

(30) Foreign Application Priority Data
Dec. 26, 2014 (JP) ................. 2014-266195

(51) Int. Cl.
*F27D 3/14* (2006.01)
*B22D 1/00* (2006.01)
(Continued)

(52) U.S. Cl.
CPC ............. *F27D 3/14* (2013.01); *B22D 1/00* (2013.01); *B22D 35/00* (2013.01); *B22D 45/00* (2013.01);
(Continued)

(58) Field of Classification Search
CPC .................... F27D 27/00; F27B 3/04
See application file for complete search history.

(56) References Cited

U.S. PATENT DOCUMENTS 6,164,365 A 12/2000 Kunstreich et al.
7,320,356 B2 1/2008 Lehman
(Continued)

FOREIGN PATENT DOCUMENTS

CN 1282280 A 1/2001
CN 1484559 A 3/2004
(Continued)

OTHER PUBLICATIONS

Extended European Search Report dated Dec. 8, 2017 in Patent Application No. 15872797.4.
(Continued)

*Primary Examiner* — Scott R Kastler
(74) *Attorney, Agent, or Firm* — Oblon, McClelland, Maier & Neustadt, L.L.P.

(57) ABSTRACT

A method of driving conductive molten metal and a melting furnace, the method including making direct current flow vertically between a first electrode, and applying a magnetic field radially toward the center of a melting chamber from the outside of the melting furnace or toward the outside of the melting furnace from the center of the melting chamber to apply torque. The method further includes rotating the molten metal by the torque to discharge the molten metal to a holding furnace, which is provided on the melting chamber, from an outlet opening of a partition plate provided between the melting chamber and the holding furnace and to suck the molten metal, which is present in the holding furnace, from an inlet opening of the partition plate.

10 Claims, 7 Drawing Sheets

(51) Int. Cl.
*B22D 35/00* (2006.01)
*B22D 45/00* (2006.01)
*F27D 27/00* (2010.01)
*F27B 14/08* (2006.01)
*C22B 9/00* (2006.01)
*F27B 14/06* (2006.01)
*F27B 14/14* (2006.01)
*F27D 11/00* (2006.01)
*F27D 11/04* (2006.01)

(52) U.S. Cl.
CPC .............. *C22B 9/003* (2013.01); *F27B 14/06* (2013.01); *F27B 14/0806* (2013.01); *F27B 14/14* (2013.01); *F27D 11/00* (2013.01); *F27D 11/04* (2013.01); *F27D 27/00* (2013.01); *Y02P 10/253* (2015.11)

(56) References Cited

U.S. PATENT DOCUMENTS

| | | | | |
|---|---|---|---|---|
| 7,736,586 | B2* | 6/2010 | Takahashi | H05B 6/34 266/233 |
| 9,410,743 | B2* | 8/2016 | Takahashi | B22D 1/00 |
| 2009/0322000 | A1 | 12/2009 | Takahashi | |
| 2014/0069602 | A1 | 3/2014 | Takahashi | |
| 2014/0079561 | A1 | 3/2014 | Takahashi | |
| 2014/0210145 | A1 | 7/2014 | Takahashi | |
| 2018/0087840 | A1 | 3/2018 | Takahashi | |

FOREIGN PATENT DOCUMENTS

| | | |
|---|---|---|
| CN | 103459064 A | 12/2013 |
| EP | 2 138 790 A2 | 12/2009 |
| EP | 2 138 790 A3 | 12/2009 |
| EP | 2 687 799 A1 | 1/2014 |
| EP | 2 708 839 A1 | 3/2014 |
| EP | 3 238 853 A1 | 11/2017 |
| JP | 3-187923 A | 8/1991 |
| JP | 2006-349293 A | 12/2006 |
| JP | 2013-76537 A | 4/2013 |
| JP | 2013-90729 A | 5/2013 |
| JP | 2014-35131 A | 2/2014 |
| WO | WO 2016/104228 A1 | 6/2016 |

OTHER PUBLICATIONS

New Zealand Office Action dated Feb. 14, 2018 in New Zealand Patent Application No. 732590, 3 pages.
Office Action dated Jul. 20, 2018 in Canadian Patent Application No. 2,971,551, 3 pages.
Combined Office Action and Search Report dated Aug. 31, 2018 in Chinese Patent Application No. 201580059654.4 with English translation, 9 pages.
International Search Report dated Feb. 23, 2016 in PCT/JP2015/084981 filed Dec. 14, 2015.

* cited by examiner

METHOD AND DEVICE FOR DRIVING CONDUCTIVE METAL

TECHNICAL FIELD

The present invention relates to a method and device for driving conductive metal (non-ferrous metal and iron), and more particularly, to a method and device for melting conductive metal, such as non-ferrous metal (conductors (conductive bodies), such as, Al, Cu, Zn, an alloy of at least two of these, or a Mg alloy)) or ferrous metal.

BACKGROUND ART

For example, the inventor has proposed a device disclosed in Japanese Patent Application No. 2013-090729 (previous application) and the like as a device for melting conductive metal. The inventor has always thought an invention, which is more excellent than the invention of the previous application and the like, or a more excellent invention having a structure different from the invention of the previous application, over and over again.

SUMMARY OF INVENTION

Technical Problem

The invention has been made by own special efforts of the inventor, and an object of the invention is to provide a more excellent method of driving conductive metal and a more excellent melting furnace.

Solution to Problem

A method of driving conductive molten metal according to the present invention includes: making direct current flow vertically between a first electrode, which is provided so as to be exposed to an inner surface of a melting chamber of a melting furnace body receiving conductive molten metal, and a second electrode, which is provided so as to be exposed to the inner surface of the melting chamber of the melting furnace body and which is provided below the first electrode, through conductive molten metal received in the melting chamber; applying a magnetic field radially toward the center of the melting chamber from the outside of the melting furnace or toward the outside of the melting furnace from the center of the melting chamber to apply torque, which is generated around a vertical axis, to the molten metal, which is present in the melting chamber, by an electromagnetic force caused by the intersection of the direct current and the magnetic field; and rotating the molten metal by the torque to discharge the molten metal to a holding furnace, which is provided on the melting chamber, from an outlet opening of a partition plate provided between the melting chamber and the holding furnace and to suck the molten metal, which is present in the holding furnace, from an inlet opening of the partition plate.

A melting furnace for conductive metal according to the present invention is a melting furnace that is provided on a holding furnace holding conductive molten metal, the melting furnace including:

a melting furnace body; and
a magnetic field device, wherein the melting furnace body includes a melting chamber that communicates with the holding furnace and a partition plate that is provided in the melting chamber, the melting chamber communicates with the holding furnace through an outlet opening and an inlet opening of the partition plate, the melting furnace body includes a first electrode and an second electrode that makes direct current flow vertically through conductive molten metal received in the melting chamber, the second electrode that being provided below the first electrode, the magnetic field device is configured to—include a permanent magnet,—apply a magnetic field radially toward the center of the melting chamber from an outer periphery of the melting furnace or toward the outside of the melting furnace from the center of the melting chamber to apply torque, which is generated around a vertical axis, to the molten metal, which is present in the melting chamber, by an electromagnetic force caused by the intersection of the direct current and the magnetic field in order to rotate the molten metal, and—discharge the molten metal, which is present in the melting chamber, to the holding furnace, on which the melting furnace is provided, from the outlet opening of the partition plate and sucks the molten metal, which is present in the holding furnace, into the melting chamber from the inlet opening of the partition plate.

DESCRIPTION OF EMBODIMENTS

Figure 1:
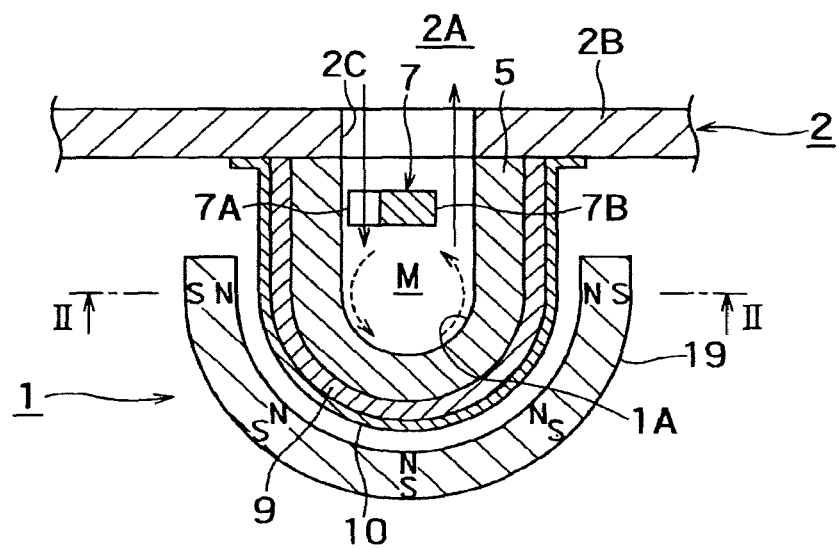
FIG. 1 is a plan view of a melting furnace for conductive metal of a first embodiment of the invention.
Figure 2:
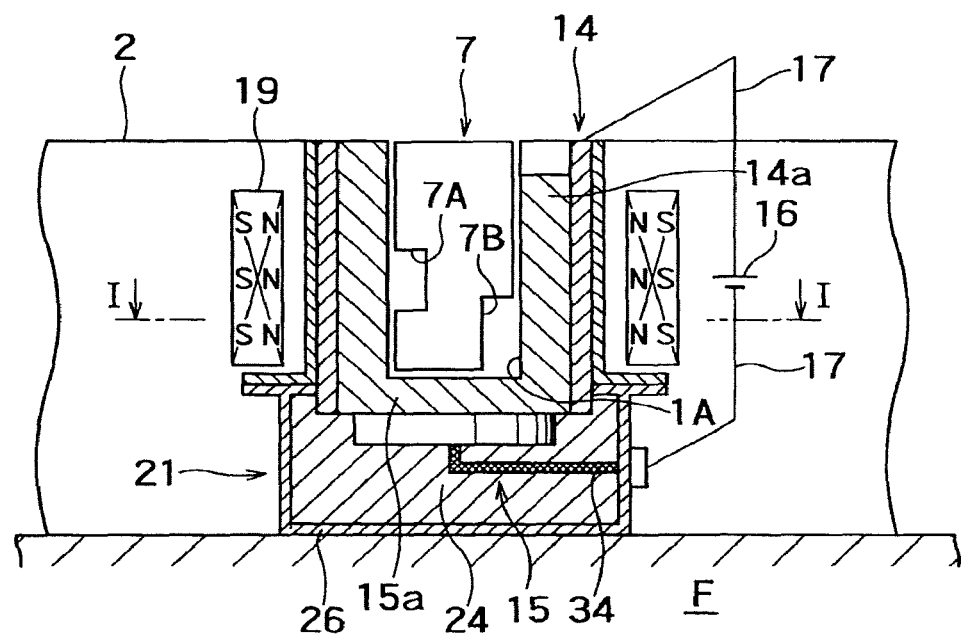
FIG. 2 is a longitudinal sectional view taken along line II-II of FIG. 1.

FIG. 1 is a cross-sectional view of a conductive metal melting furnace (melting furnace) 1 of a first embodiment of the invention provided on a holding furnace (main bath) 2, and FIG. 2 is a longitudinal sectional view. FIG. 1 is a cross-sectional view taken along line I-I of FIG. 2, and FIG. 2 is a longitudinal sectional view taken along line II-II of FIG. 1.

That is, the melting furnace 1 of this embodiment is provided on the holding furnace (main bath) 2 as particularly known from FIG. 1, and is used to melt conductive metal (non-ferrous metal and ferrous metal) and to send the melted conductive metal to the holding furnace 2. In other words, the melting furnace 1 can be used to melt conductive metal, such as non-ferrous metal (conductors (conductive bodies), such as, Al, Cu, Zn, an alloy of at least two of these, or a Mg alloy)) or ferrous metal and to send the melted conductive metal to the holding furnace 2.

That is, the melting furnace 1 is used while being connected to the large-capacity main bath 2 so as to communicate with the main bath 2 as particularly known from FIG. 1. That is, the melting furnace 1 forcibly rotates molten metal M, which is present therein, for example, counterclockwise as illustrated in FIG. 1 by a chain line, sends (discharges) the molten metal M to the main bath 2, and draws (sucks) the molten metal M from the main bath 2 simultaneously with the sending of the molten metal M. During these operations, the raw material of the conductive metal is fed to the rotating molten metal M from the upper outside, is reliably pulled into the rotating molten metal M, and is efficiently melted. That is, the rotation of the molten metal M causes vortex that is as strong as possible, so that, for example, aluminum chips as the raw material of the conductive metal fed to the vortex (that is, even though it is difficult for the raw material to sink into the molten metal since the raw material is light) are reliably drawn into the vortex and are melted with high efficiency.

Figure 9A:
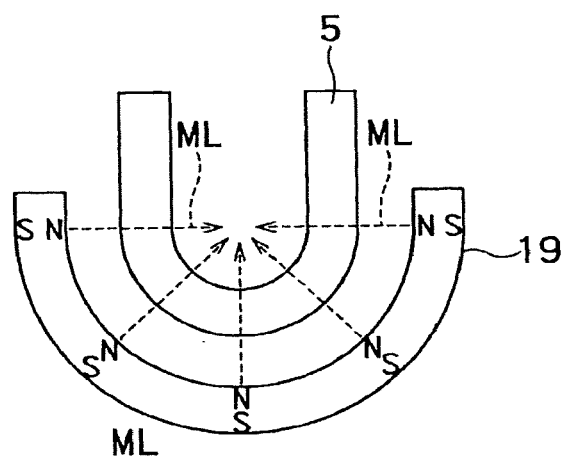
FIGS. 9(a), 9(b), and 9(c) are plan views and a longitudinal sectional view illustrating magnetic lines of force, current, and an electromagnetic force.

A force for driving the molten metal M as described above is caused by electromagnetic forces according to Fleming's left hand rule. That is, as particularly known from FIG. 2, current I is made to flow through the molten metal M in a vertical direction in FIG. 2 so that magnetic lines ML of force extend radially in a reverse direction, for example, toward the center from the periphery (or, on the contrary, radially toward the periphery from the center) in a horizontal direction. Accordingly, electromagnetic forces F1, F2, ..., FN according to Fleming's left hand rule, which are caused by the intersection of the current I and the magnetic lines ML of force, are generated as particularly known from FIG. 9(c); these electromagnetic forces F1, F2, ..., FN are composed and form one resultant force RF applied counterclockwise in FIG. 1; and the resultant force RF drives the molten metal M. Meanwhile, the resultant force is applied clockwise in FIG. 1 in a case in which the direction of magnetization of a magnetic field device 19 to be described below is opposite to that of FIG. 1.

The melting furnace 1 of the embodiment of the invention will be described in detail below.

As particularly known from FIG. 1, the melting furnace 1 is provided on the main bath 2. The inside 2A of the main bath 2 and the inside (melting chamber) 1A of the melting furnace 1 communicate with each other through an opening 2C that is formed in a side wall 2B of the main bath 2.

Figure 3:
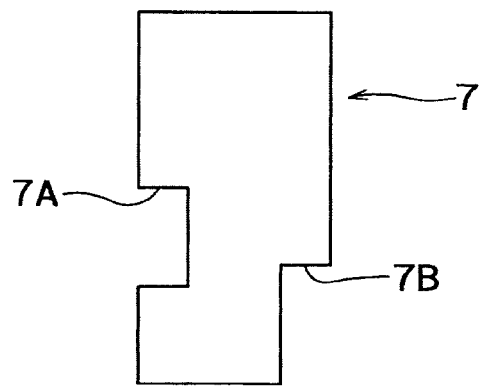
FIG. 3 is a diagram illustrating a partition plate.

In more detail, a melting furnace body 5 of the melting furnace 1 is mounted on the side wall 2B so that the melting furnace body 5 and the melting furnace 1 communicate with each other. The melting furnace body 5 is made of a refractory, and the cross-section of the melting furnace body 5 has a U shape or a semicircular shape as particularly known from FIG. 1. A drop weir 7 as a partition plate is provided in the melting chamber 1A. The drop weir 7 is inserted into the melting furnace body 5 in a liquid-tight state, and is adapted to be capable of being appropriately inserted and removed. That is, the drop weir 7 is adapted to be easily replaced in a case in which the drop weir 7 is subjected to abrasion or the like due to use. As known from FIG. 3, the drop weir 7 includes two notches and one of the two notches is an inlet 7A and the other there is an outlet 7B. Accordingly, as described above, the inside 2A of the main bath 2 and the melting chamber 1A, which is the inside of the melting furnace body 5, communicate with each other through the opening 2C of the main bath 2 and the inlet 7A and the outlet 7B of the drop weir 7. That is, as the molten metal M is rotationally driven by the resultant force RF, the molten metal M present in the main bath 2 flows (is sucked) into the melting chamber 1A of the melting furnace body 5 from the inlet 7A of the drop weir 7 and flows so as to return (be discharged) to the main bath 2 from the outlet 7B.

The melting furnace body 5 is fixed to the outside of the side wall 2B of the main bath 2 by a fixing plate 10 formed of a non-magnetic metal plate so that a side heat insulator 9 is interposed between the melting furnace body 5 and the fixing plate 10. Further, the melting furnace body 5 is provided with an upper electrode unit 14 as described below (FIG. 2).

Furthermore, a magnetic field device 19 formed of a permanent magnet device is provided around the fixing plate 10 as particularly known from FIG. 1. The magnetic field device 19 is adapted to surround the melting chamber 1A of the melting furnace body 5 in a U shape or a semicircular shape. The inner side of the magnetic field device 19 is magnetized to an N pole and the outer side thereof is magnetized to an S pole. Accordingly, the molten metal M is driven counterclockwise in FIG. 1. The direction of magnetization of the magnetic field device 19 may be opposite to the above-mentioned direction of magnetization, and the molten metal M is driven clockwise as described above in this case.

The melting furnace body 5, the heat insulator 9, the fixing plate 10, and the magnetic field device 19 are supported on a floor F by a support unit 21 that is provided therebelow. As known from FIG. 2, the support unit 21 includes a case 26 made of a non-magnetic material and a bottom heat insulator 24 is received in the case 26. In addition, a lower electrode unit 15 corresponding to the upper electrode unit 14, which has been briefly described above, is covered with the bottom heat insulator 24. Since the upper electrode unit 14 and the lower electrode unit 15 are connected to a power source 16 by wires 17, current is made to flow between these electrode units 14 and 15 through the molten metal M. The power source 16 can make at least direct current to flow, and can also switch polarities in addition to the adjustment of a current value.

The upper and lower electrode units 14 and 15 will be described in detail. Generally, a countermeasure to heat needs to be applied to each member in a melting furnace system described in the invention. For example, when aluminum is melted as conductive metal, the temperature of the melting furnace body 5 reaches several hundreds ° C. according to the melting temperature of aluminum. For this reason, in the embodiment of the invention, a special study peculiar to the invention is made about electrodes and wires provided near the melting furnace body 5.

That is, the structure of the electrodes of the upper and lower electrode units 14 and 15 connected to the power source 16 will be described in detail first. These electrodes can also be provided separately from the melting furnace body 5 as in an embodiment to be described below, but the melting furnace body 5 is formed so as to have an integrated structure in which electrodes are formed in this embodiment to be described below. Electrodes are formed integrally with a part of the melting furnace body 5 itself, that is, a side wall and a bottom wall of the melting furnace body 5. However, as described below, an upper electrode body 14*a* and a lower electrode body 15*a* are insulated from each other by an intermediate portion (a non-conductive refractory) of the melting furnace body 5 provided therebetween. That is, the melting furnace body 5 has a structure in which the upper electrode body 14*a* (a conductive refractory), the intermediate portion (a non-conductive refractory), and the lower electrode body 15a (a conductive refractory) are continuously and integrally formed.

Figure 4A:
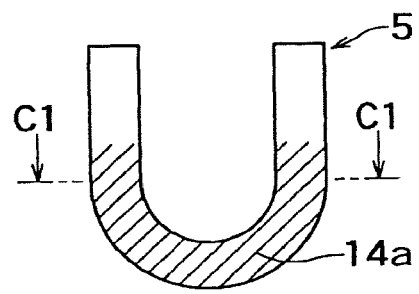
FIGS. 4(a), 4(b), and 4(c) are plan views and a side view illustrating the concept of upper and lower electrode units.
Figure 4B:
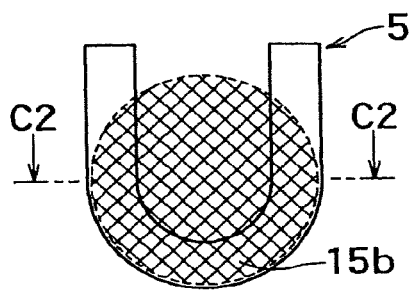
Figure 4C:
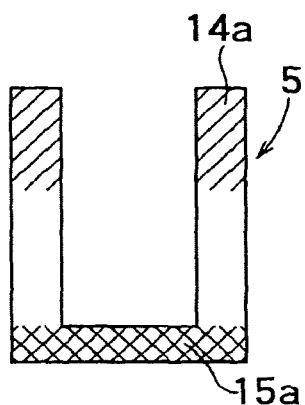

In more detail, FIGS. 4(a), 4(b), and 4(c) are a conceptual plan view, a conceptual plan view, and a conceptual longitudinal sectional view illustrating the upper and lower electrode units 14 and 15, that is, the melting furnace body 5 and the electrodes formed in the melting furnace body 5. That is, FIG. 4(a) illustrates only the upper electrode body 14a so that the planar shape of the upper electrode body 14a to be described below is easily grasped. Further, likewise, FIG. 4(b) illustrates only the lower electrode body 15a so that the planar shape of the lower electrode body 15a to be described below is easily grasped. FIG. 4(c) is a diagram corresponding to a longitudinal section taken along line c1-c1 of FIG. 4(a) and line c2-c2 of FIG. 4(b). As known from FIG. 4(c), the upper electrode body 14a is formed integrally with the upper portion of the melting furnace body 5 and the lower electrode body 15a is formed integrally with the lower portion of the melting furnace body 5. That is, the melting furnace body 5 is made of a refractory of a non-conductive material of which the coefficient of thermal expansion is very low, but a part of the melting furnace body 5 is formed as the upper and lower electrode bodies 14a and 15a having conductivity. Various techniques can be used as this manufacturing method but, for example, a technique, such as sintering, can be used. Meanwhile, the electrical resistance of an upper electrode body 44a and a lower electrode body 45a is higher than the electrical resistance of the molten metal M. However, the electrical resistance of each of the upper electrode body 44a and the lower electrode body 45a does not need to be necessarily higher than the electrical resistance of the molten metal M. In this case, in regard to the upper electrode unit 14, current I does not flows along the path of FIG. 7 to be described below and flows to the molten metal M from a portion connected to the intermediate portion (a non-conductive refractory) provided at the lower end of the upper electrode body 14a.

Figure 5A:
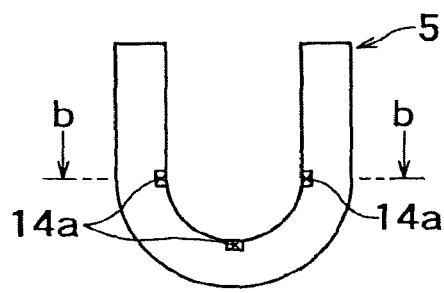
FIGS. 5(a) and 5(b) are a plan view and a side view illustrating the concept of another embodiment of the upper electrode unit.
Figure 5B:
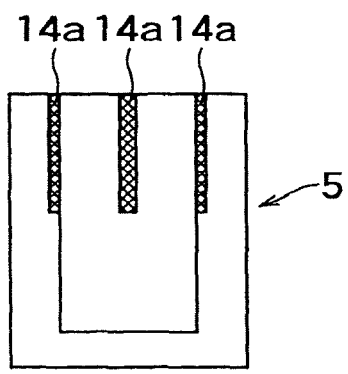

Meanwhile, the upper electrode body 14a may not have a U shape in plan view as in FIG. 4(a), and, as the upper electrode body 14a, a part of the inner wall of the melting furnace body 5 can also be integrally formed in the form of linear electrodes, which are partially long in the vertical direction, or separate electrodes can also be embedded in a part of the inner wall of the melting furnace body 5 as illustrated in FIGS. 5(a) and 5(b). The upper electrode body 14a is not limited to the above-mentioned structure. In short, the upper electrode body 14a has only to be in electrical contact with the molten metal M present therein, and the upper electrode body 14a can employ an arbitrary shape and an arbitrary structure as long as the upper electrode body 14a satisfies this purpose.

Figure 6A:
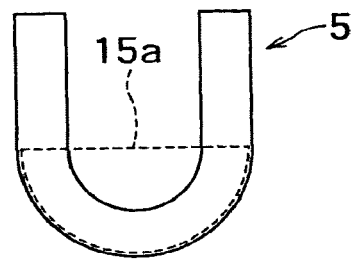
FIGS. 6(a) and 6(b) are a plan view and a side view illustrating the concepts of other embodiments of the lower electrode unit.
Figure 6B:
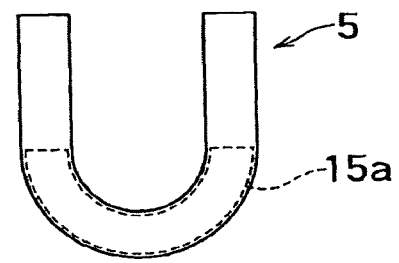

In addition, the planar shape of the lower electrode body 15a can also be formed so as to have the concepts illustrated in FIGS. 6(a) and 6(b). The planar shape of the lower electrode body 15a is not limited to the shapes illustrated in FIGS. 4(b), 6(a), and 6(b). In short, the lower electrode body 15a has only to be in electrical contact with the molten metal M present therein, and the lower electrode body 15a can employ an arbitrary shape and an arbitrary structure in a range in which the lower electrode body 15a satisfies this purpose.

Figure 7:
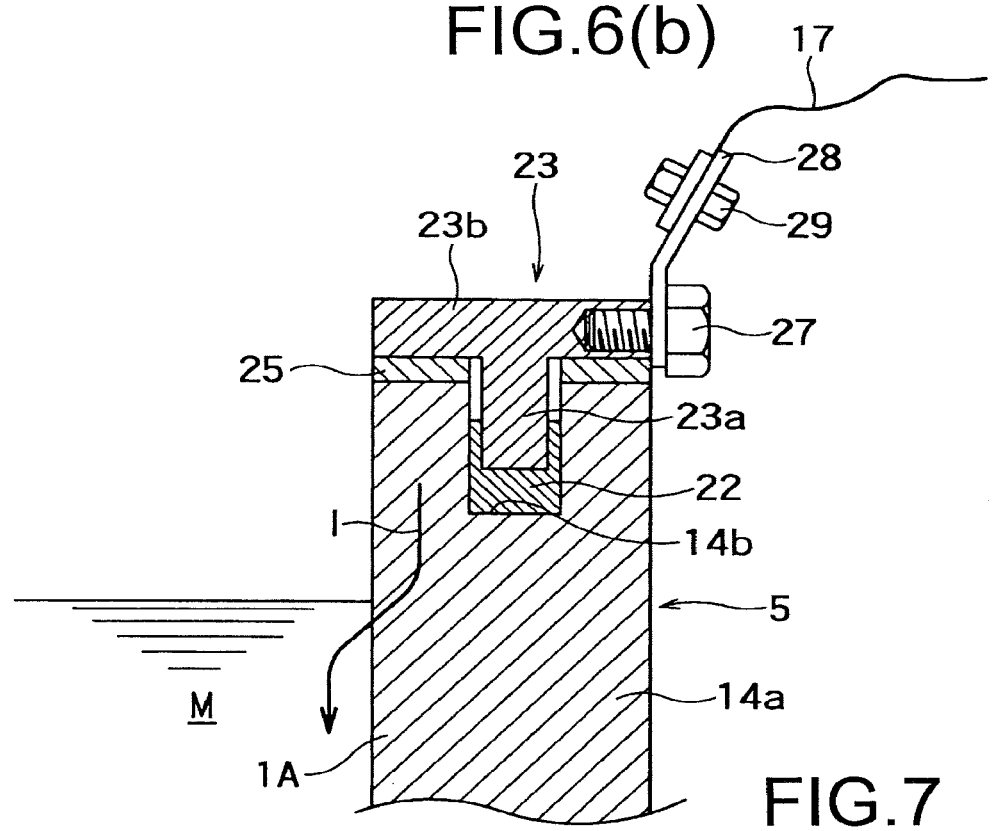
FIG. 7 is a longitudinal sectional view illustrating main parts of the upper electrode unit.

The details of the upper electrode unit 14 are illustrated in FIG. 7. FIG. 7 is an enlarged view of a part of FIGS. 2 and 4(c). This embodiment is to accurately maintain the state of the connection between the melting furnace body 5 of which the coefficient of thermal expansion is very low and a connection fitting or the like of which the coefficient of thermal expansion is high even in a case in which temperature reaches several hundreds ° C. so that electrical connection between the melting furnace body 5 and the connection fitting or the like is exactly maintained. In more detail, a groove-shaped (trench-shaped) pool 14b, of which only the upper portion is opened, for a low-melting-point alloy is formed at the upper end portion of the upper electrode body 14a of the melting furnace body 5 as illustrated in FIG. 7. A low-melting-point alloy 22 and a lower portion 23a of an electrode component 23, which is made of copper, are received in the pool 14b. The electrode component 23 includes the lower portion 23a and an upper portion 23b, and is formed so as to have a substantially T-shaped longitudinal section. Under high temperature where the melting furnace is used, the low-melting-point alloy 22 becomes liquid in the pool 14b and accurately maintains the electrical connection between the upper electrode body 14a and the upper portion 23b. Further, under low temperature where the melting furnace is not used, the low-melting-point alloy 22 is solidified in the pool 14b so as to fill a gap between the pool 14b and the lower portion 23a. A heat insulation plate 25 is interposed between the lower surface of the upper portion 23b of the electrode component 23 and the upper surface of the upper electrode body 14a. A connection fitting 28 is fixed to the upper portion 23b by a bolt 27, and the wire 17 is fixed to the connection fitting 28 by a bolt 29.

According to this structure, although briefly described above, the state of the electrical connection between the melting furnace body 5 and the electrode component 23 is maintained well by the melted low-melting-point alloy 22 even though the melting furnace body 5 (the upper electrode body 14a) scarcely expands and only the electrode component 23 or the like expands under high temperature where the melting furnace is used. Accordingly, actual use of the melting furnace is not hindered at all.

Figure 8:
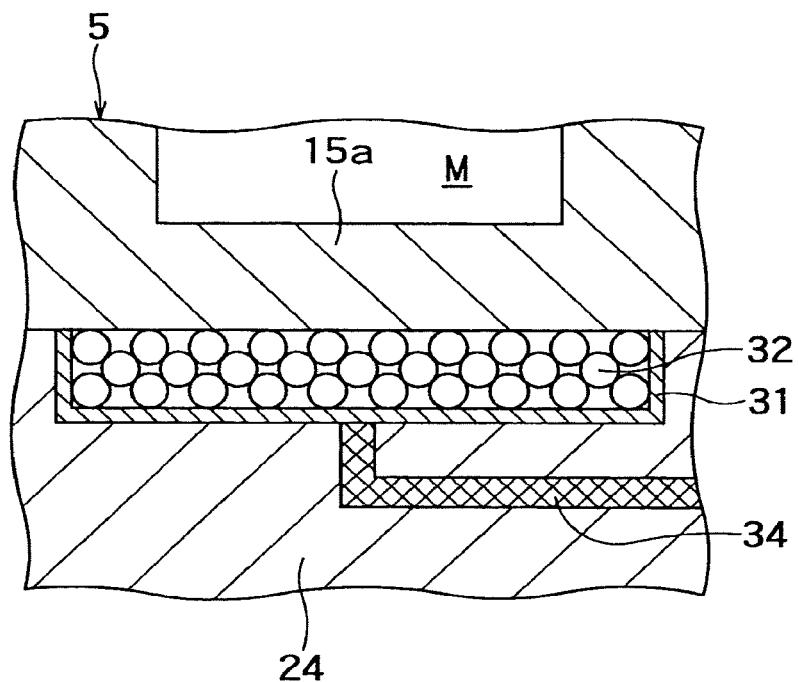
FIG. 8 is a longitudinal sectional view illustrating main parts of the lower electrode unit.

Next, the lower electrode unit 15 will be described. FIG. 8 is an enlarged view of a part of FIGS. 2 and 4(c). This embodiment is to accurately maintain the state of connection between the melting furnace body 5 of which the coefficient of thermal expansion is very low and a connection fitting or the like of which the coefficient of thermal expansion is high even in a case in which temperature reaches several hundreds ° C. so that electrical connection between the melting furnace body 5 and the connection fitting or the like is exactly maintained. In more detail, a case 31 made of copper is provided on the lower surface of the lower electrode body 15a, which is provided at the bottom portion of the melting furnace body 5, as illustrated in FIG. 8. A plurality of balls 32, 32, . . . , which are made of a conductive material, are received in the case 31. A cable 34 is connected to the lower portion of the case 31. The cable 34 is connected to the wire 17 for the power source. Accordingly, an electrical path of the lower electrode body 15a, the balls 32, the case 31, the cable 34, the wire 17, and the power source 16 is ensured. Further, in this structure, the downward bulge of the bottom portion (the lower electrode body 15a) of the melting furnace body 5 to some extent cannot be avoided due to thermal expansion during the use of the device. However, this bulge is absorbed by the balls 32. For this reason, even though the lower electrode body 15a bulges downward, the state of the electrical connection between the lower electrode body 15a and the balls 32 is reliably maintained. Meanwhile, an object having a function equivalent to the ball 32 can be used instead of the balls 32. For example, a plurality of roll bodies, that is, a plurality of cylindrical rods, each of which has the same diameter as the ball 32 and is cut to a short length, can also be stacked laterally.

As known from the above description, the connection fitting is not directly connected to the upper and the lower electrode bodies 14a and 15a made of a refractory. That is, the connection fitting is not directly connected to the upper and the lower electrode bodies 14a and 15a not having a mirror finished surface. For this reason, even when current flows between the connection fitting and the upper and the lower electrode bodies 14a and 15a, the generation of heat caused by the electrical resistance of contact portions can be prevented. Further, the connection fitting is also not fastened to the upper and the lower electrode bodies 14a and 15a, which are made of a refractory, by bolts. For this reason, even though the coefficients of thermal expansion of the upper and the lower electrode bodies 14a and 15a made of a refractory are significantly different from the coefficient of thermal expansion of the connection fitting, the loosening of the bolts and the occurrence of electrical disconnection can be reliably prevented.

Even though each connection portion and each connection component expand during the use of the melting furnace as described above, the state of connection between the power source 16 and the upper and the lower electrode bodies 14a and 15a is reliably maintained. Accordingly, since current is stably supplied between the upper and the lower electrode bodies 14a and 15a, the operation of the melting furnace 1 can be safely and stably continued.

Figure 9B:
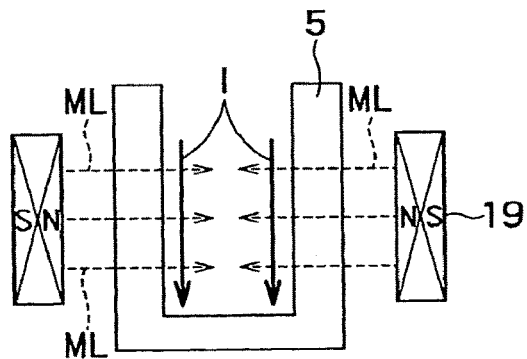
Figure 9C:
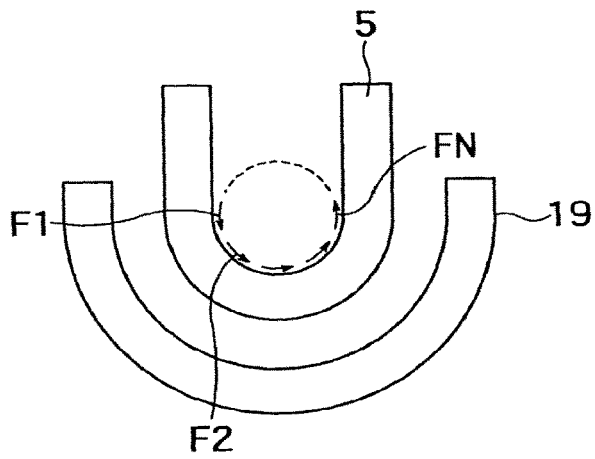

The operation of the embodiment will be described. As known from FIG. 2, direct current I supplied from the power source 16 flows vertically in FIG. 2 in a state in which the molten metal M is received in the melting chamber 1A. The height of the molten metal M is also particularly illustrated in FIG. 7. In more detail, current supplied from the wire 17 is transmitted to the electrode component 23, the low-melting-point alloy 22, and the upper portion of the upper electrode body 44a in FIG. 7. After that, the current I flows into the molten metal M from the upper electrode body 14a and flows into the lower electrode body 45a as known from FIG. 2. The aspect of the flow of the current I is illustrated in FIG. 9(b). That is, although briefly described above, the electrical resistance of each of the upper electrode body 44a and the lower electrode body 45a is higher than the electrical resistance of the molten metal M. For this reason, the current I, which flows into the upper electrode body 14a from the low-melting-point alloy 22, flows downward in FIG. 7 for a moment and then flows so as to pass along a path passing through the molten metal M, of which the electrical resistance is lower than the electrical resistance of the upper electrode body 14a, as illustrated in FIG. 7. In this way, the current I flows vertically in FIG. 9(b) as illustrated in FIG. 9(b). Further, the current I intersects the magnetic lines ML of force, which extend toward the center of the melting chamber 1A from the magnetic field device 19, over the entire circumference around a vertical central axis as known from FIG. 9(a). Accordingly, for example, counterclockwise electromagnetic forces F1, F2, . . . , FN are generated in this embodiment as known from FIG. 9(c), all of these electromagnetic forces F1, F2, . . . , FN are composed and form the resultant force RF, and the resultant force RF drives the molten metal M, which is present in the melting chamber 1A, counterclockwise in FIG. 9. Due to the drive of the molten metal M, the molten metal M is discharged to the inside 2A of the main bath 2 from the outlet 7B, which is formed on the right side of the drop weir 7 in FIG. 3, through the opening 2C of the side wall 2B of the main bath 2 and the molten metal M present in the main bath 2 is sucked into the melting chamber 1A through the opening 2C and the inlet 7A of the drop weir 7 simultaneously with the discharge of the molten metal M. Further, since the resultant force RF is obtained as the resultant force of the respective electromagnetic forces Fi as known from FIG. 9(c), the resultant force RF is very large. Accordingly, the resultant force RF allows the rotation of the molten metal M to form strong vortex. Therefore, even though a raw material, which is difficult to be melted in the molten metal M since the raw material is light like, for example, aluminum chips, is fed from the upper portion of the melting chamber 1A, the chips are reliably drawn to the center of the vortex and are rapidly melted with high efficiency.

Figure 10A:
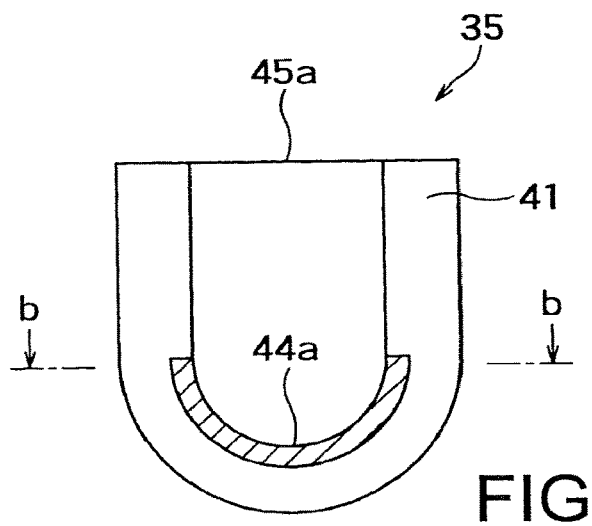
FIGS. 10(a) and 10(b) are a plan view and a longitudinal sectional view of another embodiment of a melting furnace body.
Figure 10B:
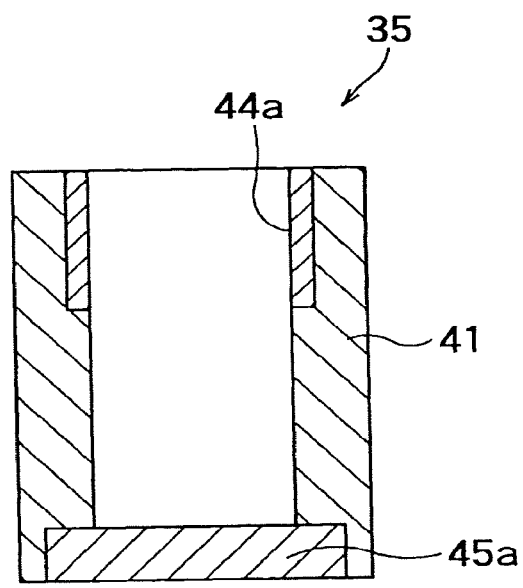

An example in which the melting furnace body 5 has an integrated structure has been described in the above-mentioned embodiment, but a melting furnace body 35 can also include a plurality of components as illustrated in FIGS. 10(a) and 10(b). That is, FIG. 10(a) is a plan view of the melting furnace body 35 and FIG. 10(b) is a sectional view taken along line b-b of FIG. 10(a). As particularly known from FIG. 10(b), the melting furnace body 35 includes a side wall part 41 that is made of a refractory, an upper electrode body 44a that is fitted to the inner surface of the side wall part 41 and is made of carbon or the like, and a lower electrode body 45a that is fitted to the lower surface portion of the side wall part 41 and is made of carbon or the like likewise. The lower electrode body 45a is adapted to be detachably mounted on the melting furnace body 35 so that maintenance can be performed. Even in the case of this embodiment, the upper and lower electrode bodies 44a and 45a are connected to the wires 17 in the same manner as that of the above-mentioned embodiment of FIGS. 7 and 8.

According to the respective embodiments, the following advantages are obtained. That is, the melting furnace can be mounted on the existing main bath 2. Since not an electromagnet but a permanent magnet is used, power consumption is very low and is ⅒ or 1/20 of power consumption of a case in which an electromagnet is used. Since the melting furnace does not include a drive part, eddy current is not generated and hindrance caused by eddy current does not occur. Since the drop weir (the partition plate) can be easily replaced, maintenance is easy. Since the wires 17 and the melting furnace bodies made of a refractory are not directly fastened to each other when being connected to the power source 16, the generation of heat caused by the contact resistance between the wires 17 and the melting furnace bodies can be prevented.

The invention claimed is:

1. A method of driving conductive molten metal, the method comprising:
   making direct current flow vertically between a first electrode, which is provided so as to be exposed to an inner surface of a melting chamber of a melting furnace body receiving conductive molten metal, and a second electrode, which is provided so as to be exposed to the inner surface of the melting chamber of the melting furnace body and which is provided below the first electrode, through conductive molten metal received in the melting chamber;
   applying a magnetic field radially toward a center of the melting chamber from outside of the melting furnace or toward the outside of the melting furnace from the center of the melting chamber to apply torque, which is generated around a vertical axis, to the molten metal, which is present in the melting chamber, by an electromagnetic force caused by an intersection of the direct current and the magnetic field; and rotating the molten metal by the torque to discharge the molten metal to a holding furnace, which is provided on the melting chamber, from an outlet opening of a partition plate provided between the melting chamber and the holding furnace and to suck the molten metal, which is present in the holding furnace, from an inlet opening of the partition plate, wherein electrodes, which are formed integrally with the melting furnace body as a part of the melting furnace body, are used as the first and second electrodes, an electrode of which electrical resistance is higher than electrical resistance of the molten metal is used as the first electrode, an upper end portion of a side wall of the melting furnace body is formed as the first electrode, a trench-shaped pool for receiving a low-melting-point alloy is formed on the first electrode, the low-melting-point alloy of which melting temperature is lower than melting temperature of the molten metal and an electrode component, which is made of metal and is used to be connected to a power source making the direct current flow, are received in the trench-shaped pool in a state in which a gap remains, and the first electrode and the electrode component are electrically connectable to each other through molten low-melting-point alloy.

2. The method of driving conductive molten metal according to claim 1, wherein a bottom wall of the melting furnace body is formed as the second electrode, the second electrode is connected to the power source through a thermal expansion absorber absorbing downward thermal expansion of the second electrode, a structure in which a plurality of balls made of conductive metal or a plurality of roll bodies stacked laterally are received in a case made of conductive metal is used as the thermal expansion absorber, and the second electrode is electrically connected to the power source.

3. A melting furnace for conductive molten metal that is provided on a holding furnace holding conductive molten metal, the melting furnace comprising:

a melting furnace body; and a magnetic field device, wherein the melting furnace body includes a melting chamber that communicates with the holding furnace and a partition plate that is provided in the melting chamber, the melting chamber communicates with the holding furnace through an outlet opening and an inlet opening of the partition plate, the melting furnace body includes a first electrode and an second electrode that makes direct current flow vertically through conductive molten metal received in the melting chamber, the second electrode being provided below the first electrode, the magnetic field device is configured to include a permanent magnet, apply a magnetic field radially toward a center of the melting chamber from an outer periphery of the melting furnace or toward outside of the melting furnace from the center of the melting chamber to apply torque, which is generated around a vertical axis, to the molten metal, which is present in the melting chamber, by an electromagnetic force caused by an intersection of the direct current and the magnetic field in order to rotate the molten metal, and discharge the molten metal, which is present in the melting chamber, to the holding furnace, on which the melting furnace is provided, from the outlet opening of the partition plate and suck the molten metal, which is present in the holding furnace, into the melting chamber from the inlet opening of the partition plate, the first and second electrodes are formed integrally with a part of the melting furnace body, and are adapted to melt molten metal of which electrical resistance is lower than electrical resistance of the first electrode, an upper end portion of a side wall of the melting furnace body is formed as the first electrode, a trench-shaped pool for receiving a low-melting-point alloy is formed on the first electrode, the low-melting-point alloy of which melting temperature is lower than melting temperature of the molten metal and an electrode component, which is made of metal and is used to be connected to a power source making the direct current flow, are received in the trench-shaped pool in a state in which a gap remains, and the first electrode and the electrode component are electrically connectable to each other through molten low-melting-point alloy.

4. The melting furnace for conductive molten metal according to claim 3, wherein a bottom wall of the melting furnace body is formed as the second electrode, the second electrode is connected to the power source through a thermal expansion absorber absorbing downward thermal expansion of the second electrode, a structure in which a plurality of balls made of conductive metal or a plurality of roll bodies stacked laterally are received in a case made of conductive metal is used as the thermal expansion absorber, and the second electrode is electrically connected to the power source.

5. A method of driving conductive molten metal, the method comprising:

making direct current flow vertically between a first electrode, which is provided so as to be exposed to an inner surface of a melting chamber of a melting furnace body receiving conductive molten metal, and a second electrode, which is provided so as to be exposed to the inner surface of the melting chamber of the melting furnace body and which is provided below the first electrode, through conductive molten metal received in the melting chamber;

applying a magnetic field radially toward a center of the melting chamber from outside of the melting furnace or toward the outside of the melting furnace from the center of the melting chamber to apply torque, which is generated around a vertical axis, to the molten metal, which is present in the melting chamber, by an electromagnetic force caused by an intersection of the direct current and the magnetic field; and rotating the molten metal by the torque to discharge the molten metal to a holding furnace, which is provided on the melting chamber, from an outlet opening of a partition plate provided between the melting chamber and the holding furnace and to suck the molten metal, which is present in the holding furnace, from an inlet opening of the partition plate, wherein a bottom wall of the melting furnace body is formed as the second electrode, the second electrode is connected to a power source through a thermal expansion absorber absorbing downward thermal expansion of the second electrode, a structure in which a plurality of balls made of conductive metal or a plurality of roll bodies stacked laterally are received in a case made of conductive metal is used as the thermal expansion absorber, and the second electrode is electrically connected to the power source.

6. The method of driving conductive molten metal according to claim 5, wherein electrodes, which are formed integrally with the melting furnace body as a part of the melting furnace body, are used as the first and second electrodes, and an electrode of which electrical resistance is higher than electrical resistance of the molten metal is used as the first electrode.

7. The method of driving conductive molten metal according to claim 5, wherein electrodes, which are formed separately from the melting furnace body, are used as the first and second electrodes, and an electrode of which electrical resistance is higher than electrical resistance of the molten metal is used as the first electrode.

8. A melting furnace for conductive metal that is provided on a holding furnace holding conductive molten metal, the melting furnace comprising:

a melting furnace body; and a magnetic field device, wherein the melting furnace body includes a melting chamber that communicates with the holding furnace and a partition plate that is provided in the melting chamber, the melting chamber communicates with the holding furnace through an outlet opening and an inlet opening of the partition plate, the melting furnace body includes a first electrode and an second electrode that makes direct current flow vertically through conductive molten metal received in the melting chamber, the second electrode being provided below the first electrode, the magnetic field device is configured to include a permanent magnet, apply a magnetic field radially toward a center of the melting chamber from an outer periphery of the melting furnace or toward outside of the melting furnace from the center of the melting chamber to apply torque, which is generated around a vertical axis, to the molten metal, which is present in the melting chamber, by an electromagnetic force caused by an intersection of the direct current and the magnetic field in order to rotate the molten metal, and discharge the molten metal, which is present in the melting chamber, to the holding furnace, on which the melting furnace is provided, from the outlet opening of the partition plate and suck the molten metal, which is present in the holding furnace, into the melting chamber from the inlet opening of the partition plate, a bottom wall of the melting furnace body is formed as the second electrode, the second electrode is connected to a power source through a thermal expansion absorber absorbing downward thermal expansion of the second electrode, a structure in which a plurality of balls made of conductive metal or a plurality of roll bodies stacked laterally are received in a case made of conductive metal is used as the thermal expansion absorber, and the second electrode is electrically connected to the power source.

9. The melting furnace for conductive molten metal according to claim 8, wherein the first and second electrodes are formed integrally with a part of the melting furnace body, and are adapted to melt molten metal of which electrical resistance is lower than electrical resistance of the first electrode.

10. The melting furnace for conductive molten metal according to claim 8, wherein the first and second electrodes are formed separately from the melting furnace body, and are adapted to melt molten metal of which electrical resistance is lower than electrical resistance of the first electrode.

* * * * *